E. F. BLAIR.
CONDIMENT HOLDER.
APPLICATION FILED JUNE 7, 1921.
1,417,444.
Patented May 23, 1922.
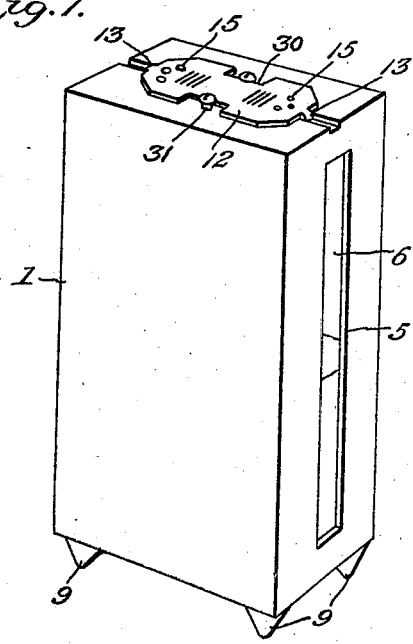
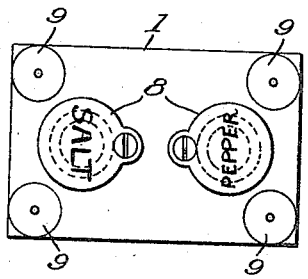
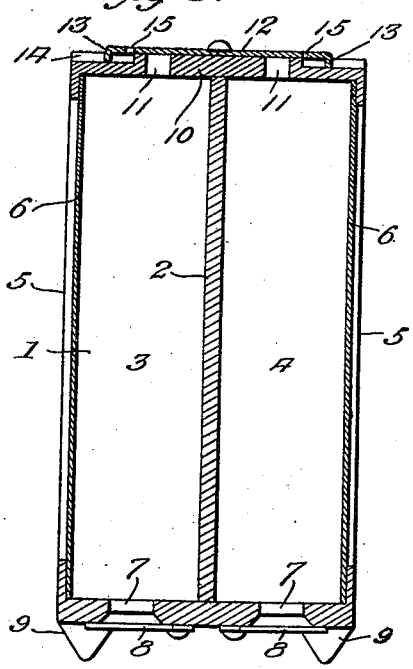
E. F. Blair INVENTOR
BY Victor J. Evans ATTORNEY
WITNESS:

UNITED STATES PATENT OFFICE.

ERNEST F. BLAIR, OF WARREN, OHIO.

CONDIMENT HOLDER.

1,417,444.  Specification of Letters Patent.  Patented May 23, 1922.

Application filed June 7, 1921. Serial No. 475,693.

*To all whom it may concern:*

Be it known that I, ERNEST F. BLAIR, a citizen of the United States, residing at Warren, in the county of Trumbull and State of Ohio, have invented new and useful Improvements in Condiment Holders, of which the following is a specification.

This invention relates to improvements in condiment holders, the general object of the invention being to provide a receptacle with compartments therein for holding different kinds of condiments, such as pepper and salt, and with improved means for closing the shaker holes of the compartments when the device is not being used.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective showing one embodiment of my invention.

Figure 2 is a bottom view thereof.

Figure 3 is a detail view of the means for controlling the outlet holes.

As shown in these views the device consists of a receptacle 1 which is divided by the partition 2 into two compartments 3 and 4 for holding the two different kinds of condiments. It will of course be understood that the device can be provided with more than two compartments if desired. A slot 5 is formed in one wall of each compartment and this slot is covered by a transparent strip 6 so that the contents can be seen and the compartments refilled when the supply has become almost exhausted. The compartments are filled through the openings 7 in the bottom of the receptacle and said openings are closed by the pivoted flaps 8. Legs 9 are connected with the bottom. The two compartments are closed by a top 10 which is provided with a pair of holes 11, one of which communicates with one compartment and the other with the second compartment. A sliding plate 12 is mounted on said top and has ears 13 sliding in a groove 14. The plate is provided with two sets of perforations 15 which are so arranged that when one set is in register with one hole the other set is out of register with the second hole. One set of perforations may be made larger than the other set when pepper and salt are placed in the compartments. The large perforations are to be used for the salt and the small ones for the pepper. When the plate is moved to its central position both holes will be closed thus preventing the material from being spilled if the device should upset and also keeping dirt and dust out of the device.

The plate 12 is provided in its edges with recesses 30, and is held to the upper end of the body 1 through the medium of headed screws 31, the shanks of which are disposed in said recesses and are therefore adapted to serve as stops in limiting the movements of the plate 12.

It will thus be seen that by my device the housewife will have both pepper and salt in the same box so that she can easily and quickly season the food.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A condiment holder comprising a receptacle having compartments to receive condiments and also having a top in which are holes in communication with the compartments and in the outer side of which are alined grooves, a slidable plate opposed to the outer side of the said top and having pendent ears at its ends movable in said alined grooves, and also having sets of apertures to be moved into and out of registration with the holes in the top and further having recesses in its side edges, and headed screws connected to the top and having shanks arranged in said recesses and adapted to serve as stops.

In testimony whereof I affix my signature.

ERNEST F. BLAIR.